(12) United States Patent
Xu et al.

(10) Patent No.: US 11,706,543 B2
(45) Date of Patent: Jul. 18, 2023

(54) IMAGE SENSOR WITH VOLTAGE SUPPLY GRID CLAMPING

(71) Applicant: OMNIVISION TECHNOLOGIES, INC., Santa Clara, CA (US)

(72) Inventors: Chengcheng Xu, San Jose, CA (US); Rui Wang, San Jose, CA (US); Bi Yuan, San Jose, CA (US); Liang Zuo, San Mateo, CA (US)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 17/531,465

(22) Filed: Nov. 19, 2021

(65) Prior Publication Data

US 2022/0078365 A1  Mar. 10, 2022

Related U.S. Application Data

(62) Division of application No. 16/708,135, filed on Dec. 9, 2019, now Pat. No. 11,218,659.

(51) Int. Cl.
| | | |
|---|---|---|
| H04N 5/232 | (2006.01) | |
| H04N 25/75 | (2023.01) | |
| H04N 25/74 | (2023.01) | |
| H04N 25/76 | (2023.01) | |
| H04N 25/709 | (2023.01) | |
| H04N 25/772 | (2023.01) | |
| H04N 25/766 | (2023.01) | |
| H04N 25/50 | (2023.01) | |

(52) U.S. Cl.
CPC ........... *H04N 25/75* (2023.01); *H04N 25/709* (2023.01); *H04N 25/74* (2023.01); *H04N 25/76* (2023.01); *H04N 25/766* (2023.01); *H04N 25/772* (2023.01); *H04N 25/50* (2023.01)

(58) Field of Classification Search
None
See application file for complete search history.

(56) References Cited

U.S. PATENT DOCUMENTS

| 2003/0127672 A1* | 7/2003 | Rahn ................. H01L 27/14609 257/E31.062 |
|---|---|---|
| 2010/0214460 A1 | 8/2010 | Hasegawa et al. |
| 2010/0295981 A1 | 11/2010 | Morimoto |
| 2013/0088625 A1 | 4/2013 | Iwata et al. |

(Continued)

*Primary Examiner* — Twyler L Haskins
*Assistant Examiner* — Wesley J Chiu
(74) *Attorney, Agent, or Firm* — Perkins Coie LLP

(57) ABSTRACT

An image sensing device includes an image sensing circuit, a voltage supply grid, bitlines, and a control circuit. The image sensing circuit includes pixels arranged in rows and columns. Each one of the bitlines is coupled to a corresponding one of the columns. The voltage supply grid is coupled to the pixels. The control circuit is coupled to output at least a row select signal and a transfer signal to the rows. Each one of the rows is selectively coupled to the bitlines to selectively output image data signals in response to the row select signal and the transfer signal. Each one of the rows is further selectively coupled to the bitlines to selectively clamp the bitlines in response to the row select signal and the transfer signal. Each one of the rows is selectively decoupled from the bitlines in response to the row select signal.

8 Claims, 6 Drawing Sheets

(56) References Cited

U.S. PATENT DOCUMENTS

| | | | |
|---|---|---|---|
| 2013/0181117 A1* | 7/2013 | Shimizu | H04N 25/74 250/208.1 |
| 2015/0077609 A1 | 3/2015 | Okamoto et al. | |
| 2015/0201118 A1 | 7/2015 | Lee et al. | |
| 2017/0125464 A1* | 5/2017 | Abe | H01L 27/14612 |
| 2017/0127002 A1* | 5/2017 | Eshel | H04N 5/3598 |
| 2020/0007808 A1* | 1/2020 | Jung | H04N 25/766 |
| 2020/0244913 A1* | 7/2020 | Jung | H04N 5/37452 |
| 2021/0099656 A1* | 4/2021 | Cho | H04N 25/40 |
| 2023/0020850 A1* | 1/2023 | Jun | H04N 25/75 |

* cited by examiner

IMAGE SENSOR WITH VOLTAGE SUPPLY GRID CLAMPING

CROSS REFERENCE TO RELATED APPLICATION

This application is a divisional application of U.S. patent application Ser. No. 16/708,135 filed on Dec. 9, 2019, now pending. U.S. patent application Ser. No. 16/708,135 is hereby incorporated by reference.

BACKGROUND INFORMATION

Field of the Disclosure

This disclosure relates generally to image sensors, in particular to image sensors with rows of pixels connected to voltage supply grids.

Background

Image sensors may be used in various devices including cameras, sensors, and consumer electronics. Image sensors may produce images with deleterious h-band artifacts in images where there is high contrast between bright areas and dark areas.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
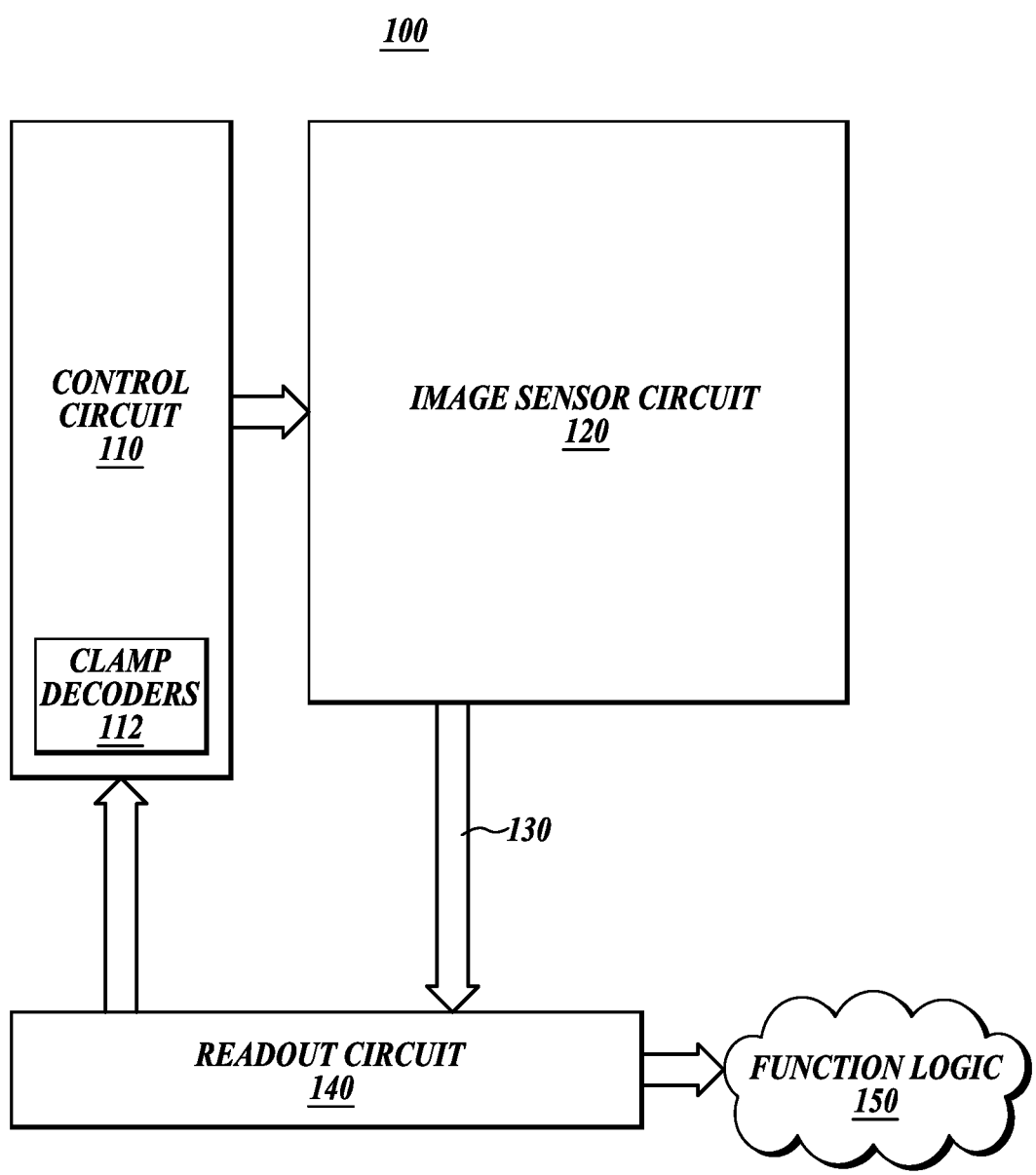
FIG. 1 is a diagram illustrating one example of an imaging system with a pixel array in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples directed to image sensors and devices are disclosed herein. In the following description, numerous specific details are set forth to provide a thorough understanding of the examples. One skilled in the relevant art will recognize, however, that the techniques described herein can be practiced without one or more of the specific details, or with other methods, components, materials, etc. In other instances, well-known structures, materials, or operations are not shown or described in detail in order to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

Image sensors may include many individual pixels arranged in rows and columns. The pixels include transistors which switch on or off depending on a voltage of an input signal input into the gate of the transistor. Each pixel in a column of pixels may be coupled to one of a plurality of bitlines. Each pixel in a row of pixels may receive the same command signals such that each pixel in the row of pixels outputs to one of the plurality of bitlines at the same time. The pixels may receive an AVDD voltage from an AVDD grid (voltage supply grid). The AVDD grid is connected to a voltage VDD. The voltage AVDD of the nodes where the pixels are connected to the AVDD grid may vary depending on the location of the node at which the pixel is attached to the AVDD grid, the current pulled through the AVDD grid, and the resistance in the AVDD grid. The output from the pixels in an active row is read out twice, once with a reset voltage at a floating diffusion node and once with a voltage based on charges generated from photodiodes at the floating diffusion node. The voltage at nodes of the AVDD grid sensing a dim light may increase in the second readout due to low current draw through the AVDD grid from nodes sensing a bright light. This change in voltage can result in deleterious h-banding in sensed images, especially when the sensed image has a large amount of contrast between bright and dark regions. H-banding occurs when dark regions of an image appear darker when in the same row as a bright region. Clamping helps to reduce h-banding by mitigating the change in current, and thus, changes in voltage in the AVDD grid. The example pixel layouts and methods of operating the pixels to clamp the AVDD grid discussed herein allow the image sensor to detect an image with reduced h-banding.

As will be discussed, example image sensors, pixels and methods of using the image sensor and pixels disclosed reduce deleterious h-banding and improve the performance of the image sensors.

FIG. 1 is a diagram illustrating one example of an imaging system 100 with a pixel array in accordance with the teachings of the present invention. The imaging system 100 includes a control circuit 110, an image sensing circuit 120, bitlines 130, readout circuit 140, and function logic 150. The control circuit 110 may include clamp decoders 112.

The control circuit 110 provides input signals to the image sensing circuit 120 to control the image sensing circuit 120. The control circuit 110 includes control logic for determining which input signals to provide to the image sensing circuit 120. The control circuit 110 also includes circuitry to output the input signals. The input signals are provided such that the image sensing circuit 120 will sense an image and output image data or image charge through the bitlines 130 to the readout circuit 140. The control circuit 110 may also include logic to control other functions of the imaging system 100 such as controlling a shutter with a shutter signal. In one embodiment, the shutter signal is a global shutter signal for simultaneously enabling all pixels in the image sensing circuit 120 to simultaneously capture their respective image data during a single acquisition window. In an alternative embodiment, the shutter signal is a rolling shutter signal whereby each row, column, or group of pixels is sequentially enabled during consecutive acquisition windows.

The bitlines 130 are arranged such that the readout circuit 140 can readout sensed input from the image sensing circuit 120. As will be discussed in greater detail below the image sensing circuit 120 includes pixels arranged in rows and columns. Each column of pixels is coupled to one of the bitlines 130 and each bitline 130 is connected to one of the columns of pixels. The output of the pixels is read by the readout circuit 140 one row at a time. The readout circuit 140 may communicate with the control circuit 110 in order to provide feedback, ensure proper timing, etc.

In one embodiment, after each pixel has acquired its image data or image charge, the image data is readout by the readout circuit 140 and transferred to function logic 150. The readout circuit 140 may include amplification circuitry, e.g., a differential amplifier circuitry, analog-to-digital ("ADC") conversion circuitry, or otherwise. The function logic 150 may include logic and memory for storing the image data or even manipulating the image data by applying post image effects (e.g., crop, rotate, remove red eye, adjust brightness, adjust contrast, or otherwise).

Figure 2:
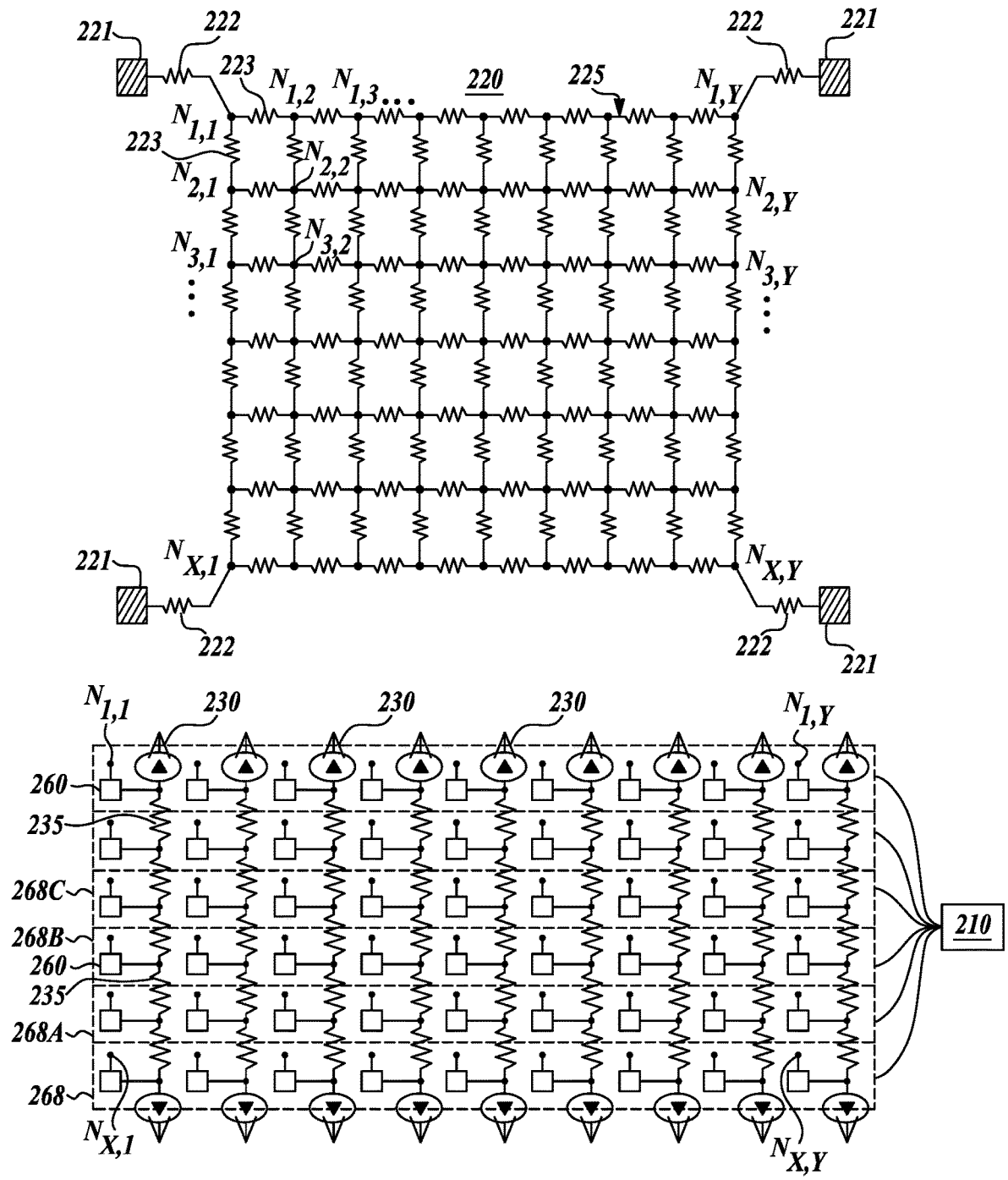
FIG. 2 illustrates an example pixel array in accordance with the teachings of the present invention.

FIG. 2 illustrates an example focused view on the image sensing circuit 220 and the bitlines 230. The image sensing circuit 220 includes an AVDD grid 225 (or voltage supply grid), and pixels 260. The pixels 260 are connected to the AVDD grid 225 at nodes $N_{u,v}$. The nodes $N_{u,v}$ are arranged in rows and columns where 'u' represents the row and 'v' represents the column in the AVDD grid 225. The nodes $N_{u,v}$ are connected both vertically and horizontally in a grid. The AVDD grid 225 may have any number of rows and columns, accordingly, the AVDD grid 225 may have 'x' rows and 'y' columns. The pixels 260 are similarly arranged in 'x' rows and 'y' columns with the pixels 260 connected to the nodes $N_{u,v}$ such that each pixel is connected to the AVDD grid 225. For example, a pixel 260 in the first row and first column of pixels 260 is connected to the node $N_{1,1}$, a pixel 260 in the first row and last column is connected at node $N_{1,y}$, a pixel 260 in the last row and first column is connected at node $N_{x,y}$, and a pixel 260 in the last row and last column is connected at node $N_{x,y}$.

The AVDD grid 225 is connected to a VDD voltage source 221. A resistance 222 exists between the VDD voltage source 221 and the AVDD grid 225. The resistance 222 may be caused by the intrinsic resistance of conductors and junctions connecting the VDD voltage source 221 and the AVDD grid 225. The individual resistances 222 generally may have similar values. Resistances 223 also exist between the nodes $N_{u,v}$. The resistances 223 may be caused by the intrinsic resistance of conductors and junctions connecting the different nodes $N_{u,v}$. The individual resistances 223 generally will have similar values.

As discussed above, the pixels 260 are arranged in rows of pixels 268. Each row of pixels 268 is coupled to receive a set of input signals from the control circuit 210. Restated, each pixel 260 receives a set of input signals from the control circuit 210 based on the row of pixels 268 of the pixel 260. The control circuit 210 is coupled to output a row select signal, a transfer signal, and a reset signal to each row of pixels 268. Each pixel 260 in a column of pixels 260 is connected to a bitline 230. Resistances 235 exist between connection points on the bitlines 230. The resistances 235 may be caused by the intrinsic resistance of conductors and junctions connecting the different connection points of the bitlines 230 where the pixels 260 are connected. In one example embodiment, the row of pixels 268A is an active row and outputs image data or image charge to the bitlines 230 based on the input signals from the control circuit 210. In the same example embodiment, the rows of pixels 268B and 268C are idle rows (meaning that these rows do not output image data or image charge to the bitlines 230) which are used as clamping rows based on input signals received from the control circuit 210. A single row of pixels 268 may be used for clamping, or multiple rows of pixels 268 may be used for clamping. One of the rows of pixels 268 used for clamping (clamping row) may be a proximate row of pixels 268B to the active row of pixels 268A, meaning the row of pixels 268 directly next to the active row of pixels 268A.

The voltage AVDD received by the pixels 260 from the AVDD grid 225 may vary depending on location from which the pixel 260 is attached to the AVDD grid 225, the current pulled through the AVDD grid 225 and the resistance of the AVDD grid 225. Restated, the resistances 222 and 223 between the VDD voltage source 221 and the node $N_{u,v}$ at which the pixel 260 is attached to the AVDD grid 225 will affect the voltage received at the pixel 260. This change in voltage can result in deleterious h-banding in sensed images, especially when the sensed image has a large amount of contrast between bright and dark regions. By clamping a row of pixels 268 proximate to the active row of pixels 268A the change in voltage can be mitigated at the nodes $N_{u,v}$ connected to the active row of pixels 268A. Further, when clamping of the AVDD grid 225 is performed the voltage at the nodes $N_{u,v}$ changes less during read out. Accordingly, there is less of a settling time between readouts, so the image sensing circuit 220 may readout the output voltages through the bitlines 330 more quickly. Thus, the performance of the imaging system 100 may be improved.

Figure 3:
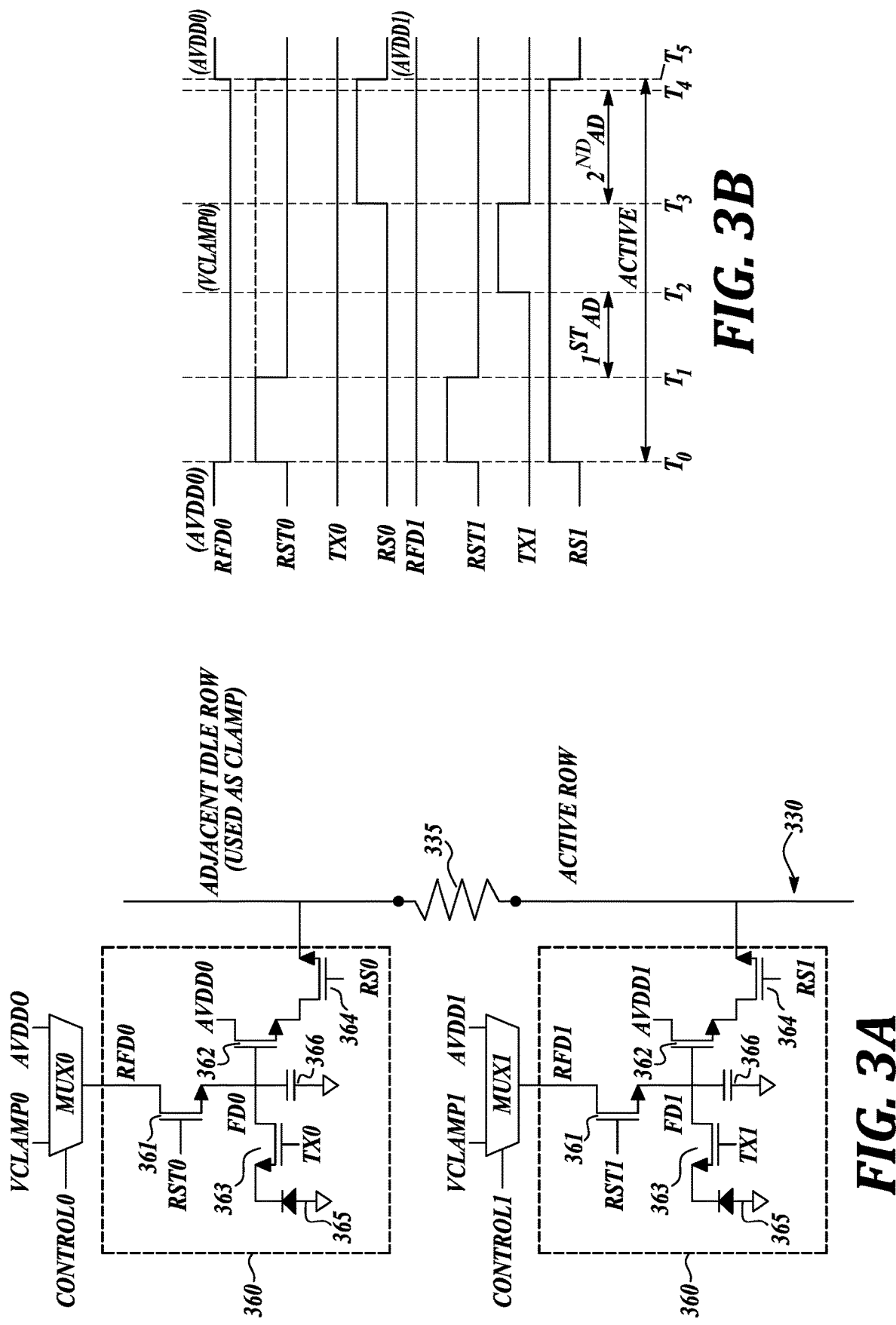
FIGS. 3A and 3B illustrates example pixels and example inputs for active rows and clamping rows of pixels in accordance with the teachings of the present invention.

FIGS. 3A and 3B illustrate example pixels 360 and example inputs for active rows and clamping rows of pixels 360 in accordance with the teachings of the present invention. FIG. 3A illustrates two pixels 360, one in an active row and one in an adjacent idle row used as a clamping row. The pixels 360 are connected to the bitline 330 and have resistance 335 between the connection points of the pixels 360. Each pixel 360 includes a photodiode 365, transfer transistor 363, a floating diffusion capacitor 366, an amplifying transistor 362, a reset transistor 361, and a row select transistor 364.

The photodiode 365 is coupled to photogenerate image charge in response to incident light. The transfer transistor 363 is coupled to the photodiode 365 and is configured to transfer the image charge to a floating diffusion node FD0, FD1 based on a transfer signal TX0, TX1. The floating diffusion capacitor 366 is coupled to the floating diffusion node FD0, FD1 as well. Accordingly, the transfer transistor 363 is coupled to transfer the image charge from the photodiode 365 to the floating diffusion capacitor 366 in response to the transfer signal TX0, TX1. The amplifying transistor 362 is coupled to the floating diffusion capacitor 366 through the floating diffusion node FD0, FD1 to generate one of the image data signals in response to charge at the floating diffusion capacitor 366. The reset transistor 361 is coupled between a variable voltage source RFD0, RFD1 (in the illustrated case an output from multiplexers MUX0 or MUX1) and the floating diffusion capacitor 366. The multiplexers MUX0, MUX1 respectively output the voltage sources RFD0, RFD1, based on control signals CONTROL0, CONTROL1 from the control circuit 210. The variable voltage source RFD0, RFD1 is coupled to the floating diffusion capacitor 366 through the reset transistor 361 in response to a reset signal RST0, RST1. The row select transistor 364 is coupled between the amplifying transistor 362 and the bitline 330 and coupled to transmit the image data signal to the bitline in response to a row select signal RS0, RS1.

FIG. 3B illustrates example inputs received by the pixels 360 during a time when the active row is active. For purposes of this description an "on voltage" is a voltage sufficient to turn on one of the transistors such that it operates as a closed switch and an "off voltage" is a voltage insufficient to turn off one of the transistors such that it operates as an open switch. At $T_0$, the voltage source RFD0 switches from AVDD grid voltage AVDD0 to a clamp voltage VCLAMP0, reset signal RST0 switches to an on voltage, reset signal RST0 switches to an on voltage, row select signal RST1 switches to an on voltage. The voltage source RFD0 may switch from AVDD grid voltage AVDD0 to a clamp voltage VCLAMP0 based on a control signal CONTROL0 received at the multiplexer MUX0. The clamp voltage VCLAMP0 is a voltage below the AVDD grid voltage AVDD0 and above zero. At $T_1$, reset signals RST0 and RST1 switch to an off voltage. Alternatively, RST0 may remain at an on voltage. Between $T_1$ and $T_2$ a first readout of the bitline 330 is taken by the readout circuit 140. At $T_2$, transfer signal TX1 is switched to an on voltage. At $T_3$, row select signal RS0 is switched to the AVDD grid voltage AVDD0 and the transfer signal TX1 is switched to an off voltage. Between $T_3$ and $T_4$, a second readout of the bitlines 330 is taken by the readout circuit 140. At $T_5$, the input signals return to their values before $T_0$. The transmission signal TX0 remains at an off voltage throughout the time when the active row is active.

During the first readout by the readout circuit 140, the pixel 360 in the clamping row has the row select transistor 364 off so it will not read out to the bitline, the pixel 360 in the active row will have a voltage at the source of the row select transistor 364 (coupled to the bitline 330) of a reset voltage, which is about the AVDD grid voltage AVDD1.

During the second readout by the readout circuit 140, the pixel 360 in the clamp row will have the voltage at the amplifying transistor 362 gate in the source follower range. This is because the voltage at the floating diffusion node FD0 (coupled to the gate of the amplifying transistor 362) is the clamping voltage VCLAMP0 and the clamping voltage VCLAMP0 is below the turn on voltage for the amplifying transistor 362. The row select transistor 364 is turned on by the row select signal RS0. Accordingly, a voltage at the source of the row select transistor 364 (coupled to the bitline 330) will have a voltage of about the clamp voltage VCLAMP0 minus a gate to source voltage drop. Thus, the row select transistor 364 is coupled to selectively clamp the AVDD grid 225 in response to 1) the transfer transistor 363 isolating the floating diffusion node FD0 from the photodiode 365 in response to the transfer signal TX0 and 2) the reset transistor 361 applying a first clamp voltage VCLAMP0 to the floating diffusion capacitor 366 in response to the reset signal RST0 prior to the row select signal RS0 enabling the row select transistor 364.

Accordingly, the pixel 360 in the clamp row will pull a current from the bitline 330 to the node $N_{u,v}$ at which the pixel 360 in the clamp row is connected to the AVDD grid 225. This current draw pulls current through the AVDD grid 225 from the position close to the active pixel 360, so that current distribution on the AVDD grid 225 changes little between the first and the second readout. Restated, there is less change in current flow between the first and second readouts in the active row of the AVDD grid 225 when the adjacent row of pixels 268 is clamped compared to when the adjacent row is not clamped. This makes the voltage at the nodes $N_{u,v}$ along the active row of pixels 268 more consistent between the first readout and the second readout.

During the second readout by the readout circuit 140, the pixel 360 in the active row will have the voltage at the floating diffusion node FD1 based on the charge output by the photodiode 365. A voltage at the source of the amplifying transistor 362 is determined based on the charge at the gate of the amplifying transistor 362, and thus, an image voltage is output by the row select transistor 364 (which is turned on by the row select signal RS1) based on the voltage at the source of the amplifying transistor 362. The row select transistor 364 is coupled to selectively output the image data signals to the respective bitline 330 in response to the transfer transistor 363 transferring the image charge from the photodiode 365 to the floating diffusion node FD0, FD1 prior to the row select signal RS1 turning on the row select transistor 364.

The photodiode 365 generates negative charge in response to incident light. Accordingly, a sensed bright light will result in a large amount of negative charge being transferred to floating diffusion node FD1 (connected to the gate of the amplifying transistor 364) before the second readout and the amplifying transistor 362 being off during the second readout so that no current being drawn through the pixel 360. Conversely, no light being sensed will result in the amplifying transistor 362 maintaining the reset voltage (which is the AVDD grid voltage AVDD1), and thus, being on and drawing current through the pixel 360.

Each one of the pixels 360 is selectively coupled (meaning an electrical connection) to a respective bitline 330 to selectively output image data signals in response to the row select signal RS0, RS1 and the transfer signal TX0, TX1. Because the row select signals RS0, RS1 and the transfer signals TX0, TX1 are sent to each row of pixels 268 by the control circuit 210, each one of the rows of pixels 268 is selectively coupled to the bitlines 330 to selectively output image data signals in response to the row select signal RS0, RS1 and the transfer signal TX0, TX1. Further, each one of the pixels 360 is selectively coupled (meaning an electrical connection) to a respective bitline 330 to selectively clamp the AVDD grid 225 in response to the row select signal RS0, RS1 and the transfer signal TX0, TX1. Accordingly, each row of pixels 268 is selectively coupled to the bitlines 330 to selectively clamp the AVDD grid 225 in response to the row select signal RS0, RS1 and the transfer signal TX0, TX1.

Rows of pixels 268 which are inactive and not used for clamping are selectively uncoupled (meaning electrically disconnected, e.g. the row select transistor functions as an open switch) in response to the row select signal being an off signal. Accordingly, the row select transistor 364 is coupled to selectively output said one of the image data signals to the respective bitline 330 in response to the row select signal RS0, RS1 and the transfer signal TX0, TX1. The row select transistor 364 is coupled to selectively clamp the AVDD grid 225 in response to the row select signal RS0, RS1 and the transfer signal TX0, TX1. And the row select transistor 364 is selectively decoupled from the respective bitline 330 in response to the row select signal RS0, RS1.

Figure 4:
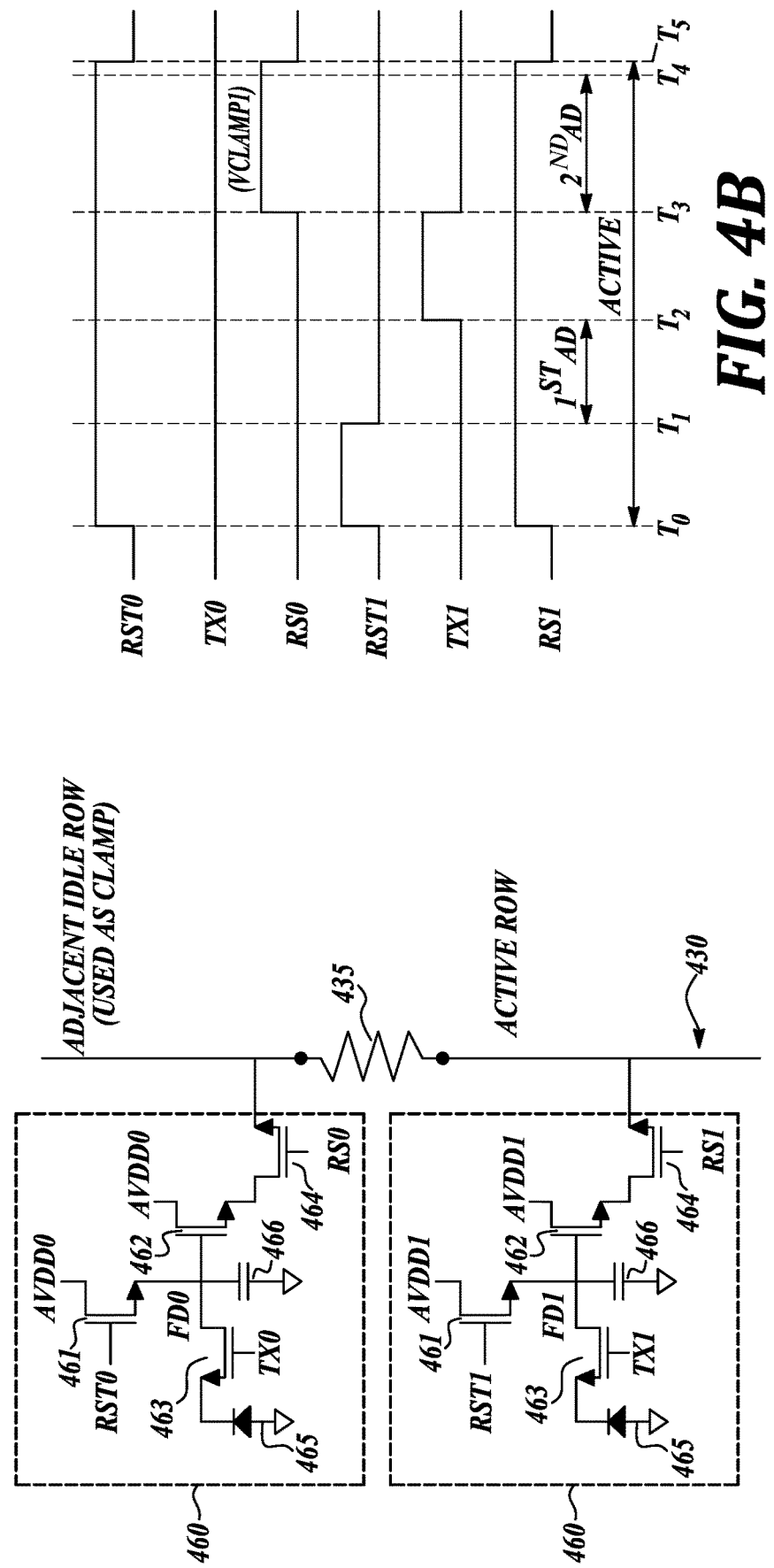
FIGS. 4A and 4B illustrates other example pixels and example inputs for active rows and clamping rows of pixels in accordance with the teachings of the present invention.

FIGS. 4A and 4B illustrates other example pixels 460 and example inputs for active rows and clamping rows of pixels 460 in accordance with the teachings of the present invention. FIG. 4A illustrates pixels 460, one in an active row and one in an adjacent idle row used as a clamping row. The pixels 460 are connected to the bitline 430 and have resistance 435 between the connection points of the pixels 460. Each pixel 460 includes a photodiode 465, transfer transistor 463, a floating diffusion capacitor 466, an amplifying transistor 462, a reset transistor 461, and a row select transistor 464. The components of the pixels 460 are connected in a similar manner to the components of the pixels 360 except that the drain of the reset transistor 461 is connected to the AVDD grid 225 and receives the AVDD grid voltage AVDD0, AVDD1 as the voltage source.

FIG. 4B illustrates example inputs received by the pixels 460 during a time when the active row is active. At $T_0$, the reset signals RST0, RST1 and the row select signal RS1 are switched to an on voltage. At $T_1$, the reset signal RST1 is switched to an off voltage. Between $T_1$ and $T_2$, a first readout of the bitline 430 is taken by the readout circuit 140. At $T_2$, the transfer signal TX1 is switched to an on voltage. At $T_3$, the transfer signal TX1 is switched to an off voltage and row select signal RS0 is switched to a clamp voltage VCLAMP1 between an on voltage and an off voltage. Between $T_3$ and $T_4$, a second readout of the bitline 430 is taken by the readout circuit 140. At $T_5$, the input signals return to their values before $T_0$. The transmission signal TX0 remains at an off voltage throughout the time when the active row is active.

During the first readout by the readout circuit 140, the pixel 460 in the clamping row has the row select transistor 464 off so it will not read out to the bitline. The pixel 460 in the active row will have the amplifying transistor 462 and the row select transistor 464 on. Accordingly a voltage at the source of the row select transistor 464 (connected to the bitline 430) will be the AVDD grid voltage AVDD1. Accordingly, the pixel in the active row will readout to the bitline 430.

During the second readout by the readout circuit 140, the voltage at the gate of the amplifying transistor 462 in the clamping row is the AVDD grid voltage AVDD0 since the reset signal RST0 is at the on voltage. Accordingly, the amplifying transistor 462 in the clamping row is on and a voltage at the drain of the row select transistor 464 of the clamping row is the AVDD grid voltage AVDD0. The voltage at the gate of the row select transistor 464 is the clamp voltage VCLAMP1. In various examples, it is noted that the clamp voltage is generated based on a band gap, and that the clamp voltage VCLAMP1 described in FIGS. 4A-4B may be the same voltage value as the clamp voltage VCLAMP0 described in FIG. 3A-3B. Thus, it is appreciated that VCLAMP0 and VCLAMP1 may also be referred to collectively as clamp voltage VCLAMP.

In the example shown in FIGS. 4A-4B, clamp voltage VCLAMP is between an on voltage and an off voltage, accordingly, the row select transistor 464 of the clamping row will act as a source follower and the voltage at the source of the row select transistor 464 will be about the clamp voltage VCLAMP1 minus a gate to source voltage drop of the row select transistor 464. This will clamp the voltage at the nodes $N_{u,v}$ in a similar manner as described above with relation to FIG. 3B. Accordingly, the row select transistor 464 of the clamping row is coupled to selectively clamp the bitline 430 in response to 1) the transfer transistor 463 isolating the floating diffusion node FD0 from the photodiode 465 in response to the transfer signal TX0 and 2) the reset transistor 461 applying a reset voltage (AVDD0) to the floating diffusion capacitor 466 in response to the reset signal RST0 prior to the row select signal RS0 applying a clamp voltage VCLAMP1 to a gate terminal of the row select transistor 464 of the clamping row.

During the second readout by the readout circuit 140, the pixel 460 in the active row will have the voltage at the floating diffusion node FD1 based on the charge output by the photodiode 465. A voltage at the source of the amplifying transistor 462 is determined based on the charge at the gate of the amplifying transistor 462, and thus, an image voltage is output by the row select transistor 464 (which is turned on by the row select signal RS1) based on the voltage at the source of the amplifying transistor 462.

For both the control of the pixels 360 and pixels 460 in the embodiments discussed with relation to FIGS. 3B and 4B, respectively; the control circuit 210 is coupled to cause a clamp voltage VCLAMP0, VCLAMP1 to be applied to a first terminal of the row select transistor 364, 464 (the first terminal may be the gate or the drain of the row select transistor 364, 464) to control the pixel 360, 460 to selectively clamp the AVDD grid 225 such that a clamp current passes through a second terminal (source of the row select transistor 364, 464).

Figure 5:
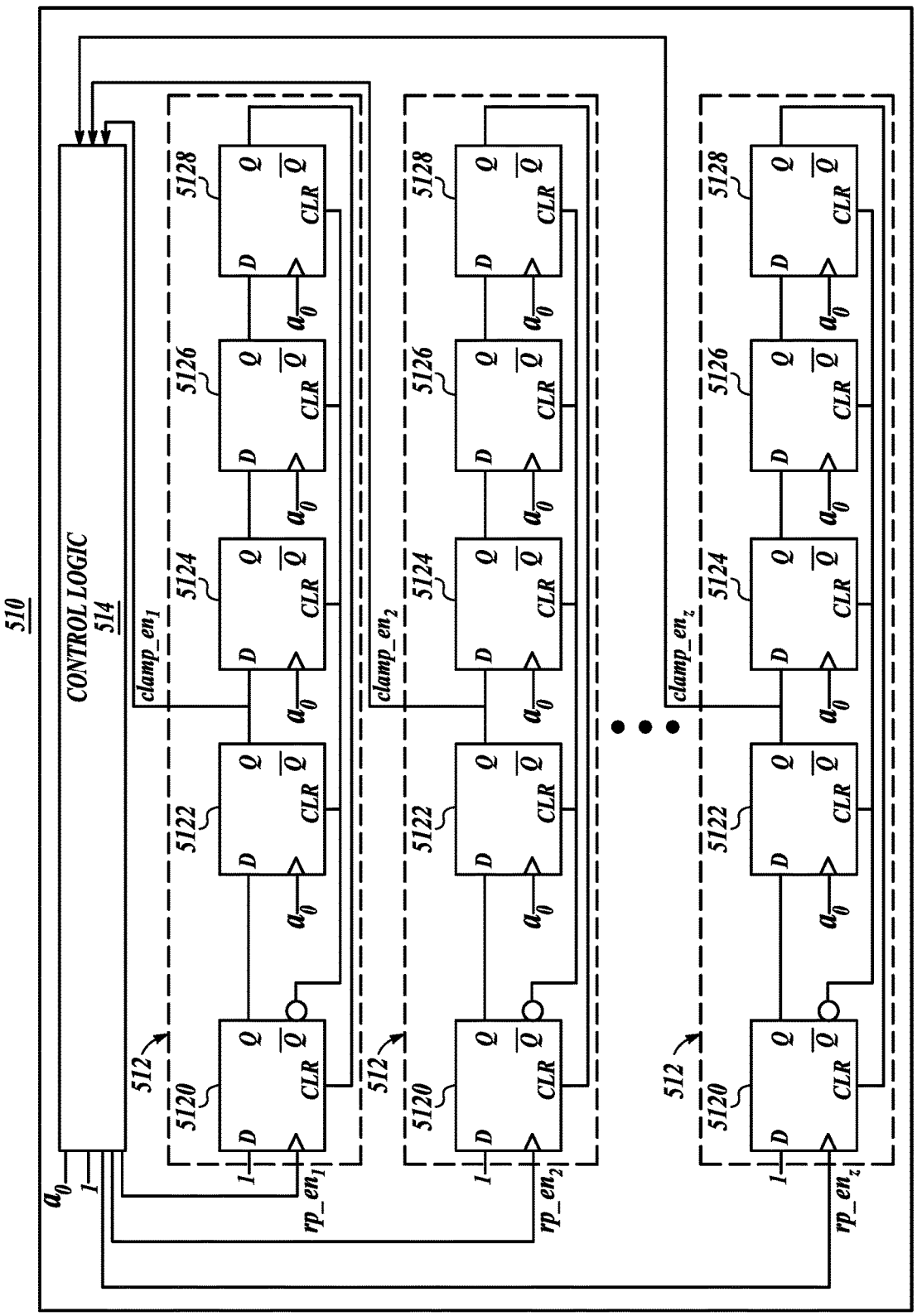
FIG. 5 illustrates an example control circuit in accordance with the teachings of the present invention.

FIG. 5 illustrates an example control circuit 510 in accordance with the teachings of the present invention. In one example, control circuit 510 is configured to control the example pixels 360 described above in FIGS. 3A-3B. The control circuit 510 includes control logic 514 and clamp decoders 512. Each of the clamp decoders 512 includes a plurality of D flip-flops 5120, 5122, 5124, 5126, 5128 connected in series. Each of the D flip-flops 5120, 5122, 5124, 5126, 5128 includes an input port (D), a clock port (>), an output port (Q), a clear port (CLR), and a complementary output port ($\overline{Q}$), which outputs a complementary output, which is the logical complement of the output of the output port. The output of each D flip-flop at the output port changes to be the same as the input signal received at the input port when a rising edge of a clock signal is received at the clock port. When a rising edge is received at the clear port of the D flip-flops 5120, 5122, 5124, 5126, 5128 the output is reset to '0'.

A first D flip-flop 5120 receives a first input value of '1' from the control logic 514 at the input port and a row enable signal rp_en$_n$ (where 'n' indicates which of the clamp decoders 512 receives the signal) at the clock port. The row enable signal rp_en$_n$ has a rising edge when the row associated with the clamp decoder 512 becomes the active row (for example at $T_0$ in FIG. 3B). As an example, if the first clamp decoder 512 is associated with the first row of pixels 268, then the control logic will send a row enable signal rp_en$_1$ to the first clamp decoder 512 when the first row of pixels 268 is the active row.

The control logic 514 may maintain a row count indicating which row of pixels 268 is the active row. The progression of active row may be sequential. Accordingly, the next row to be active will be a directly proximate row. The control logic 514 may send a row enable signal rp_en$_n$ of "1" to a clamp decoder 512 associated with a row when the row count indicates that the row associated with the clamp decoder 512 is the active row.

In the illustrated example, the clamp decoders 512 have five D flip-flops, however any number of D flip-flops greater than two may be used depending on the desired number of rows to be clamped. The second-fifth D flip-flops 5122, 5124, 5126, 5128 receive the output of the previous D flip-flop 5122 as an input at the input port. The second to fifth D flip-flops 5122, 5124, 5126, 5128 receive a clock signal $a_0$ from the control logic 514 which has a rising edge whenever the active row of pixels 268 changes (e.g. a change in the row count). The second to fifth D flip-flops 5122, 5124, 5126, 5128 receive the output of the differential output of the first D flip-flop 5120 in the clear port. The fifth D flip-flop 5128 outputs an output to the clear port of the first D-flip-flop 5120. The output of the second D flip-flop 5122 is also output to the control logic 514 as a clamp enable signal $clamp\_en_n$. The control logic 514 controls the inputs to the pixels 260 (e.g. reset signal RST0, transfer signal TX0, row select signal RS0) in the row of pixels 268 associated with the clamp decoder 512 as a clamp row (as described with relation to FIG. 3B) when the clamp enable signal $clamp\_en_n$ is '1'. Restated, the control circuit 510 outputs the row select signal RS0 and the reset signal RST0 based on the clamp enable signal $clamp\_en_n$.

The clamp decoders 512 function as counters providing a clamp enable signal $clamp\_en_n$ of '1' for four active rows after the row of pixels 268 associated with the clamp decoder 512 is the active row. Then the clamp decoder 512 will be reset until the row of pixels associated with the clamp decoder 512 is the active row again. The number of rows for which the clamp enable signal $clamp\_en_n$ of '1' is output can be changed by changing the number of D flip-flops in the clamp decoder 512. For example, a clamp decoder with three D flip-flops will provide the clamp enable signal $clamp\_en_n$ of '1' for two active rows after the associated row is active. The clamp decoders 512 are coupled to output the clamp enable signal $clamp\_en_n$ with a first clamp enable value (for example '0') when a row enable signal $rp\_en_n$ switches to a first value (for example '1') and output the clamp enable signal $clamp\_en_n$ with a second clamp enable value (for example '1') for a number of changes of a row count after the row enable signal $rp\_en_n$ switches to the first value.

There may be 'z' clamp decoders 512. Each row of pixels 268 may have a clamp decoder 512 associated with the row such that the number of clamp decoders 512 'z' is equal to the number of rows of pixels 268 'x'. Alternatively, because h-banding is generally not a significant problem for the rows of pixels 268 closest to the voltage source 221, the clamp decoders 512 may only be associated with a middle section of the rows of pixels 268. For example, and each row of pixels 268 except a top and bottom four rows of pixels 268 may have a clamp decoder 512 associated with the row, such that the number of clamp decoders 512 'z' is eight less than the number of rows of pixels 268 'x'. Restated, the number of clamp decoders 512 'z' may be equal to or less than the number of rows of pixels 268 'x'.

The clamp decoders 512 represent only one way for the control circuit 510 to track which rows of pixels 268 are to be clamped. In different embodiments, different mechanisms may be used to track which rows of pixels 268 are to be clamped. Further, a different number or set of rows of pixels 268 proximate to the active row may be used as clamp rows.

Figure 6:
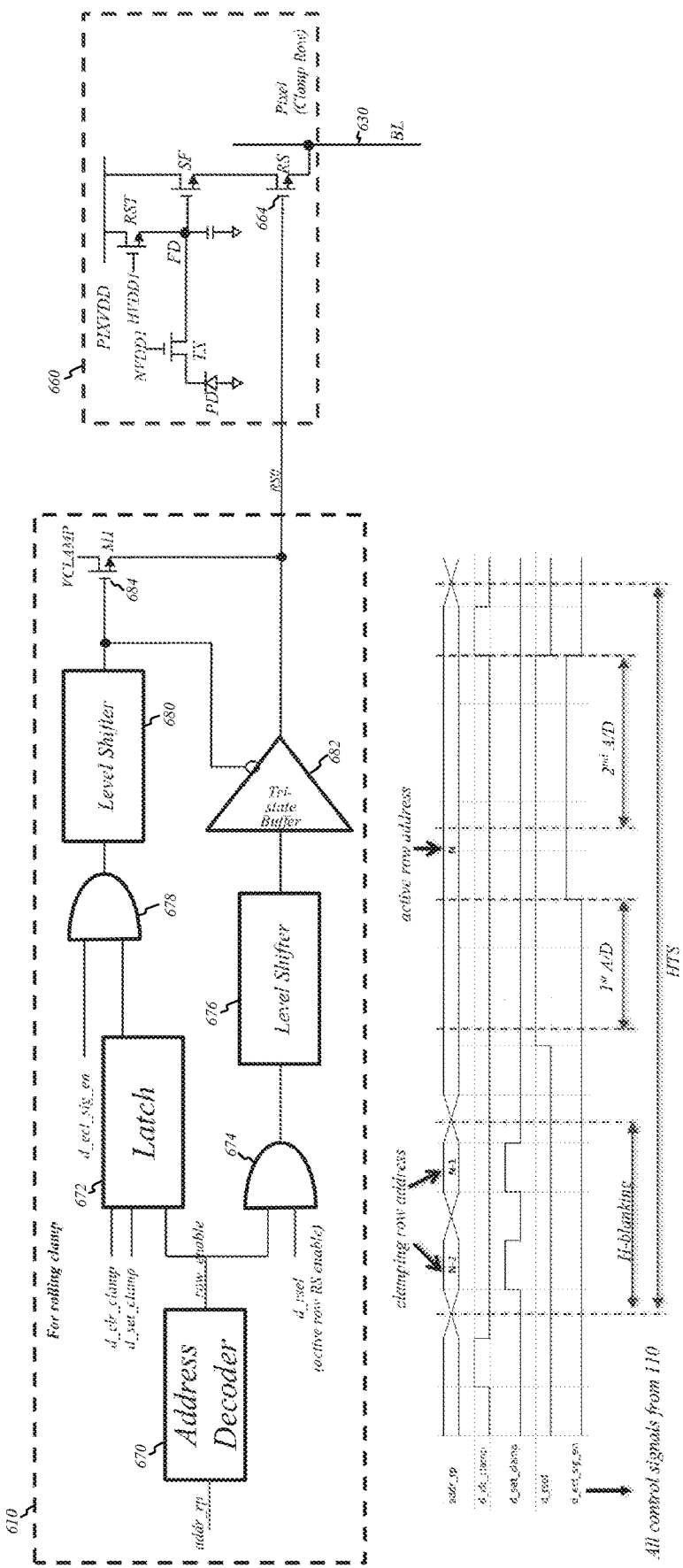
FIG. 6 illustrates another example control circuit in accordance with the teachings of the present invention.

FIG. 6 illustrates another example of control circuit 610 in accordance with the teachings of the present invention. In one example, control circuit 610 is configured to control the example pixels 460 described above in FIGS. 4A-4B. As such, the row select signal RS0 generated by control circuit 610 during the second readout of pixel 660 through bitline 630 is (e.g., between T3 and T4 as shown and described above in FIG. 4B) is equal to clamp voltage VCLAMP.

Referring back to the example depicted in FIG. 6, control circuit 610 is coupled to receive a plurality of control signals from control circuitry, such as control circuit 110 of FIG. 1. In the depicted example, control circuit 610 is coupled to receive five control signals including for instance an addr_rp signal (e.g., an address signal), a d_clr_clamp signal (e.g., a clear clamp signal), a d_set_clamp signal (e.g., a set clamp signal), d_rsel signal (e.g., an active row RS enable signal), and a d_ecl_sig_en signal (e.g., an ECL signal enable signal). Control circuit 610 includes an address decoder 670 coupled to generate a row_enable signal in response to the addr_rp signal. A latch 672 is coupled to receive the row_enable signal, as well as the d_clr_clamp signal and the d_set_clamp signal. A first AND gate 674 is coupled to receive the row_enable signal as well as the d_rsel signal. A second AND gate 678 is coupled to receive the output of latch 672 as well as the d_ecl_sig_en signal. A first level shifter 676 is coupled to receive the output of the first AND gate 674 and a second level shifter 680 is coupled to receive the output of the second AND gate 678. As shown, tri-state buffer 682 is coupled to receive the level shifted output of first AND gate 674 through first level shifter 676 as well as the level shifted output of second AND gate 678 through second level shifter 680. A gate terminal of a switch M1 684 is coupled to receive the level shifted output of second AND gate 678 through second level shifter 680, and a drain terminal of the switch M1 684 is coupled to receive the clamp voltage VCLAMP (e.g., clamp voltage VCLAMP1 of FIGS. 4A-4B). The source terminal of the switch M1 684 is coupled to the output of the tri-state buffer 682, which is coupled to generate the row select signal RS0 that is coupled to be received by row select transistor 664 of pixel 660.

In the illustrated example, during the H-blanking period of operation, the addresses of the clamp rows are selected by latch 672 through the addr_rp address (e.g., "N-2" and "N-1" in FIG. 6) received by address decoder 670 and the latch control signals d_clr_clamp and d_set_clamp received by latch 672. The number of clamp rows is configurable in various example, and the timing example depicted in FIG. 6 shows an example with the number of clamp rows equal to two.

During operation, if the row is a clamping row, the switch M1 684 will be turned on and the output of the tri-state buffer 682 will be high impedance (HZ) in response to the level shifted output of second AND gate 678 in response to the d_ecl_sig_en control signal. As such, the row select signal RS0 that is received by row select transistor 664 of pixel 660 is equal to the clamp voltage VCLAMP through the switch M1 684 (e.g., between T3 and T4 as shown and described above in FIG. 4B).

On the other hand, if the row is an active row or an idle row, the switch M1 684 will be turned off and the output of the tri-state buffer will be determined by the level shifted output of first AND gate 674 in response to the active row RS enable d_rsel signal and the output of the address decoder 670 in response to the addr_rp control signal.

The above description of illustrated examples of the present invention, including what stop is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An image sensing device, comprising:
    an image sensing circuit including a plurality of pixels arranged in a plurality of rows and a plurality of columns, wherein each one of the plurality of pixels comprises:
        a photodiode coupled to photogenerate image charge in response to incident light;
        a transfer transistor coupled to the photodiode;
        a floating diffusion capacitor coupled to the transfer transistor, wherein the transfer transistor is coupled to transfer the image charge from the photodiode to the floating diffusion capacitor in response to a transfer signal;
        an amplifying transistor coupled to the floating diffusion capacitor to generate one of the image data signals in response to charge in the floating diffusion capacitor;
        a reset transistor coupled between a voltage source and the floating diffusion capacitor, wherein the voltage source is coupled to the floating diffusion capacitor through the reset transistor in response to a reset signal; and
        a row select transistor coupled between the amplifying transistor and a respective one of a plurality of bitlines;
    a voltage supply grid coupled to the plurality of pixels;
    the plurality of bitlines, wherein each one of the plurality of bitlines is coupled to a corresponding one of the plurality of columns; and
    a control circuit coupled to output at least a row select signal and the transfer signal to each one of the plurality of rows,
    wherein each one of the plurality of rows is selectively coupled to the plurality of bitlines to selectively output image data signals in response to the row select signal and the transfer signal,
    wherein each one of the plurality of rows is further selectively coupled to the plurality of bitlines to selectively clamp the plurality of bitlines in response to the row select signal and the transfer signal,
    wherein each one of the plurality of rows is selectively decoupled from the plurality of bitlines in response to the row select signal,
    wherein the row select transistor is coupled to selectively output said one of the image data signals to the respective bitline in response to the row select signal and the transfer signal,
    wherein the row select transistor is further coupled to selectively clamp the respective one of the plurality of bitlines in response to the row select signal and the transfer signal,
    wherein the row select transistor is selectively decoupled from the respective one of the plurality of bitlines in response to the row select signal,
    wherein the row select transistor is further coupled to selectively clamp the respective one of the plurality of bitlines while an on voltage is applied to a gate terminal of a row select transistor of another one of the plurality of pixels coupled to the respective one of the plurality of bitlines in response to the transfer transistor isolating the floating diffusion capacitor from the photodiode in response to the transfer signal and the reset transistor applying a reset voltage to the floating diffusion capacitor in response to the reset signal prior to the row select signal applying a clamp voltage to a gate terminal of the row select transistor, and
    wherein the clamp voltage that is applied to the gate terminal of the row select transistor is between the on voltage for the gate terminal of the row select transistor and an off voltage for the gate terminal of the row select transistor.

2. An image sensing device, comprising:
    an image sensing circuit including a plurality of pixels arranged in a plurality of rows and a plurality of columns;
    a voltage supply grid coupled to the plurality of pixels;
    a plurality of bitlines, wherein each one of the plurality of bitlines is coupled to a corresponding one of the plurality of columns; and
    a control circuit coupled to output at least a row select signal and a transfer signal to each one of the plurality of rows, wherein the control circuit includes:
        an address decoder coupled to generate a row enable signal in response to an address signal;
        a latch coupled to receive the row enable signal, a clear clamp signal, and a set clamp signal;
        a first AND gate is coupled to receive the row enable signal an active row RS enable signal;
        a second AND gate is coupled to receive an output of the latch and an ECL signal enable signal;
        a tri-state buffer coupled to receive a level shifted output of the first AND gate and a level shifted output of the second AND gate; and
        a switch coupled having a drain coupled to a clamp voltage, a gate coupled to receive the level shifted output of the first AND gate, and a source coupled to an output of the tri-state buffer, wherein the row select signal is coupled to be generated at the output of the tri-state buffer,
    wherein each one of the plurality of rows is selectively coupled to the plurality of bitlines to selectively output image data signals in response to the row select signal and the transfer signal,
    wherein each one of the plurality of rows is further selectively coupled to the plurality of bitlines to selectively clamp the plurality of bitlines in response to the row select signal and the transfer signal, and
    wherein each one of the plurality of rows is selectively decoupled from the plurality of bitlines in response to the row select signal.

3. The image sensing device of claim 2, further comprising a first level shifter coupled to generate the level shifted output of the first AND gate in response to the output of first AND gate.

4. The image sensing device of claim 2, further comprising a second level shifter coupled to generate the level shifted output of the second AND gate in response to the output of second AND gate.

5. An image sensing device, comprising:
a plurality of bitlines;
a plurality of pixels, wherein each of the plurality of pixels includes a row select transistor, wherein the row select transistor includes a first terminal and a second terminal, wherein the first terminal is a gate of the row select transistor, wherein the second terminal is connected to one of the plurality of bitlines;
a control circuit coupled to control the plurality of pixels; and
a voltage supply grid coupled to the plurality of pixels,
wherein each one of the plurality of pixels is coupled to selectively output an image data signal to said one of the plurality of bitlines,
wherein each one of the plurality of pixels is further coupled to selectively clamp said one of the plurality of bitlines,
wherein each one of the plurality of pixels is arranged to selectively decouple from said one of the plurality of bitlines,
wherein the control circuit is coupled to cause a clamp voltage to be applied to the first terminal of the row select transistor while an on voltage is applied to a first terminal of a row select transistor of another one of the plurality of pixels coupled to said one of the plurality of bitlines to control the pixel to selectively clamp said one of the plurality of bitlines such that a clamp current passes through the second terminal, and
wherein the clamp voltage that is applied to the first terminal of the row select transistor is between the on voltage for the first terminal of the row select transistor and an off voltage for the first terminal of the row select transistor.

6. An image sensing device, comprising:
a plurality of bitlines;
a plurality of pixels, wherein each of the plurality of pixels includes a row select transistor, wherein the row select transistor includes a first terminal and a second terminal, wherein the second terminal is connected to one of the plurality of bitlines;
a control circuit coupled to control the plurality of pixels, wherein the control circuit includes:
an address decoder coupled to generate a row enable signal in response to an address signal;
a latch coupled to receive the row enable signal, a clear clamp signal, and a set clamp signal;
a first AND gate is coupled to receive the row enable signal an active row RS enable signal;
a second AND gate is coupled to receive an output of the latch and an ECL signal enable signal;
a tri-state buffer coupled to receive a level shifted output of the first AND gate and a level shifted output of the second AND gate; and
a switch coupled having a drain coupled to a clamp voltage, a gate coupled to receive the level shifted output of the first AND gate, and a source coupled to an output of the tri-state buffer, wherein the row select signal is coupled to be generated at the output of the tri-state buffer; and
a voltage supply grid coupled to the plurality of pixels,
wherein each one of the plurality of pixels is coupled to selectively output an image data signal to said one of the plurality of bitlines,
wherein each one of the plurality of pixels is further coupled to selectively clamp said one of the plurality of bitlines,
wherein each one of the plurality of pixels is arranged to selectively decouple from said one of the plurality of bitlines,
wherein the control circuit is coupled to cause a clamp voltage to be applied to the first terminal of the row select transistor to control the pixel to selectively clamp said one of the plurality of bitlines such that a clamp current passes through the second terminal.

7. The image sensing device of claim 6, further comprising a first level shifter coupled to generate the level shifted output of the first AND gate in response to the output of first AND gate.

8. The image sensing device of claim 6, further comprising a second level shifter coupled to generate the level shifted output of the second AND gate in response to the output of second AND gate.

* * * * *